GEORGE W. HUTCHINSON
INVENTOR.

BY
ATTORNEY.

July 1, 1941. G. W. HUTCHINSON 2,247,553
CONCRETE TESTING APPARATUS
Filed Sept. 5, 1939  3 Sheets-Sheet 2
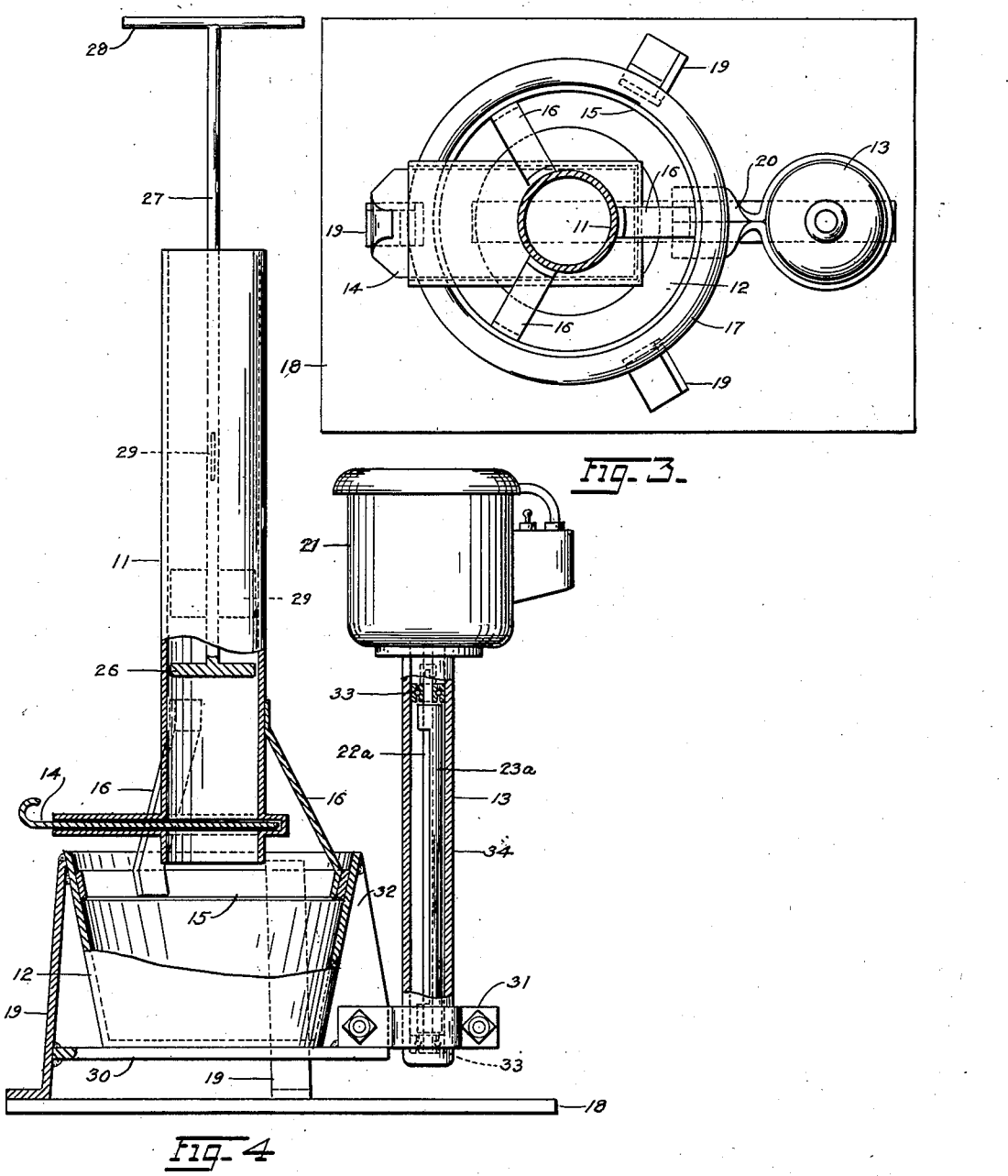
GEORGE W. HUTCHINSON
INVENTOR.
BY
ATTORNEY.

Patented July 1, 1941

2,247,553

UNITED STATES PATENT OFFICE 2,247,553

CONCRETE TESTING APPARATUS

George W. Hutchinson, Raleigh, N. C.

Application September 5, 1939, Serial No. 293,344

8 Claims. (Cl. 73—51)

This invention relates to apparatus for measuring the properties of unset concrete.

The object of the invention is to provide an apparatus for measuring or testing the relative placeability of unset concrete mixes of low plastic properties.

The usual methods, such as for example the "slump test" or "flow-table" test, for measuring the plastic properties of concrete mixes of the usual type having sufficient cement and water to provide plastic flow, are of little or no value when used on harsh mixtures resulting from low cement content, or very low water ratios, or involving excessively sharp aggregates. In practice, it has been found that these harsh mixtures may be compacted by internal vibration, even when plastic flow is lacking when the material is unvibrated. Where the vibrational energy is sufficient, the vibrating material takes on a simulated plasticity which permits it to be placed and compacted. The apparatus of this invention is adapted to measure and compare the "placeability" under vibration of these harsh non-plastic mixtures.

In general, the determination of the placeability consists in measuring the time rate of flow, under vibration, of substantially non-plastic mixtures such as concrete. To accomplish this, I confine a known volume of the mixture so that it may flow downwardly when acted upon simultaneously by gravity and vibration. It has been found that the harsh mixtures to which this invention is particularly applicable, when confined laterally and in the absence of vibration, do not flow plastically under the influence of gravity, but when vibration is applied to the material, if free to move under the influence of gravity, a simulated plastic flow may be induced, and the time rate of this flow may be measured.

Figures 1, 2:
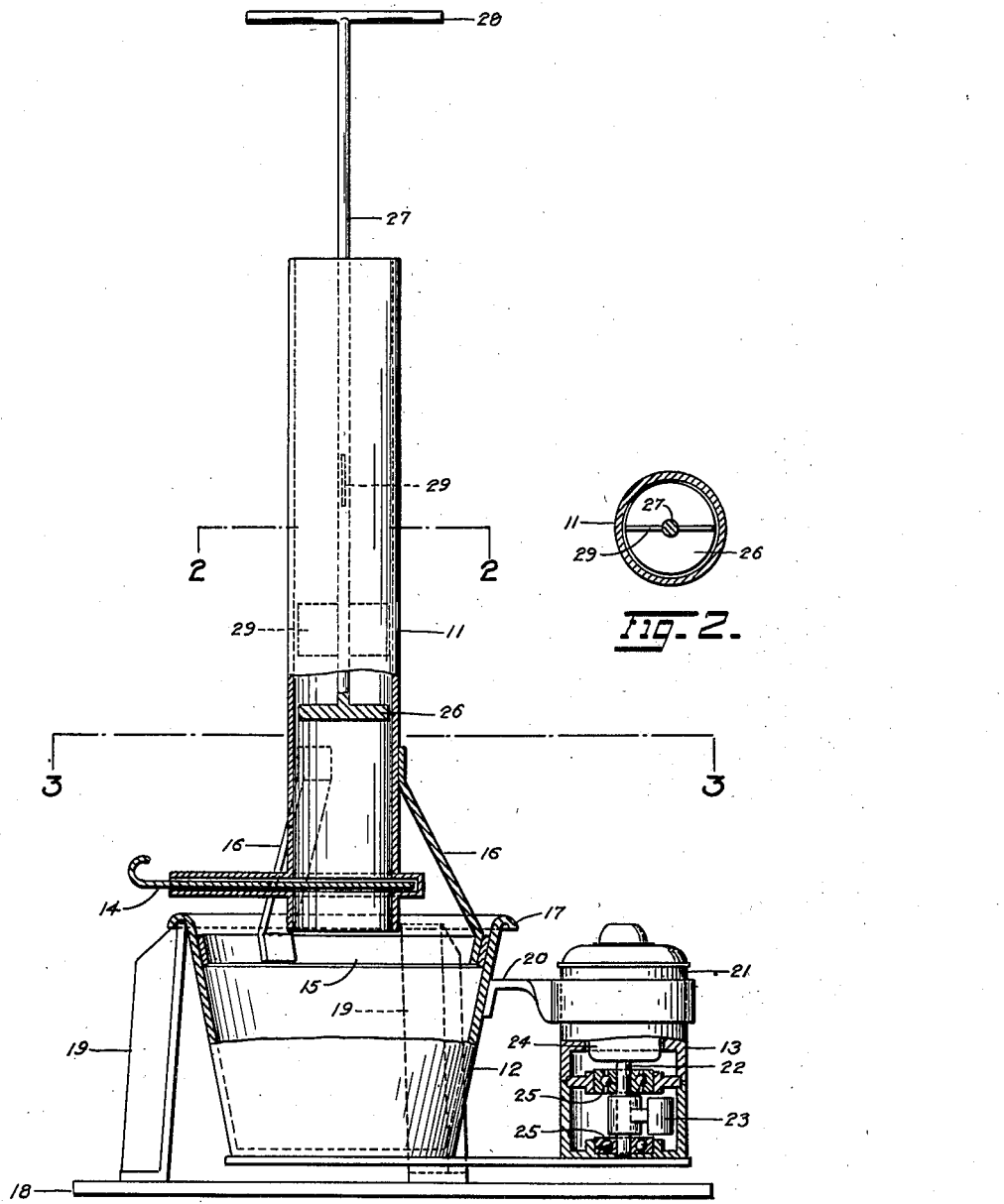
Figure 5:
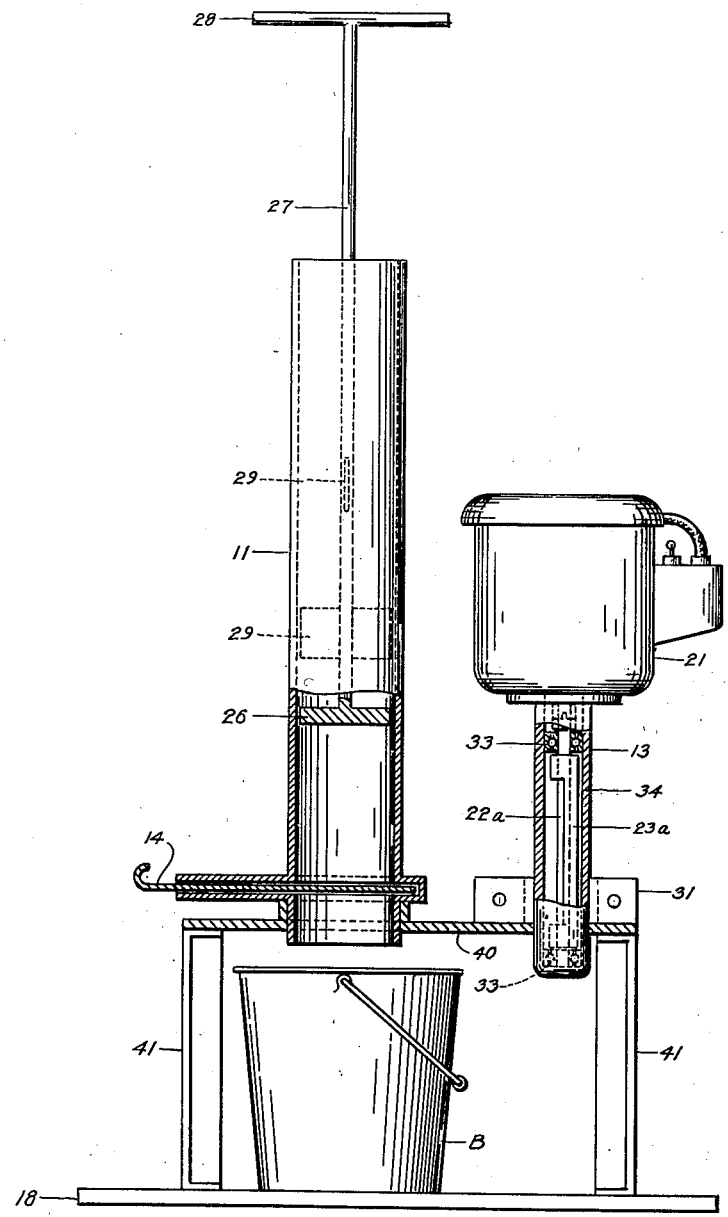

The invention will be understood best by reference to the accompanying drawings showing several forms of apparatus in which the measurement may be carried out, in which Fig. 1 is an elevation, partly in section, showing one form of my invention; Fig. 2 is a cross-sectional view taken on the line 2—2 of Fig. 1; Fig. 3 is a cross-sectional view taken on the line 3—3 of Fig. 1; Fig. 4 is an elevation, partly in section, showing an alternative form of apparatus of my invention; Fig. 5 is an elevation, partly in section, showing still another form of apparatus of my invention.

Referring to the drawings, the apparatus consists generally of a discharge hopper 11, a receiving container 12, and a vibrator mechanism 13. Referring particularly to Figs. 1, 2 and 3, the upper or discharging hopper 11 is an open-ended elongated, vertical cylinder having a sliding gate valve 14 near its lower end. It is desirable that this gate valve, 14, when open, will permit the unrestricted flow of material, i. e. the opening is the same as the cross-sectional area of the cylinder 11. A ring frame member 15 having inverted legs 16 attached to the outside of the cylinder 11, supports the cylinder and its appurtenances, and fits within and near the top rim of the receiving container 12, which is suspended for vibration by the braces 19 rigidly attached to the base plate 18 at their lower ends, and at their upper ends removably attached under the overturned rim 17. The vibrator mechanism 13 is attached rigidly to the receiving container 12, by the brackets 20. The vibrator 13 may be of any suitable type which will generate high frequency vibrations of sufficient frequency and energy to vibrate the testing device. As shown, it consists of an electric motor 21, having a vertically disposed shaft 22 attached to the rotor 24 and revolving in bearings 25, and an eccentric weight 23 attached to the shaft 22. When the motor revolves at high speeds, preferably about 8000 R. P. M., radial vibration in a horizontal plane is generated by the eccentric weight on the shaft, and vibrational energy is transmitted directly to the receiving container 12, and through the ring frame member 15 and the legs 16 to the cylinder 11. A gauging piston 26, adapted to move in the cylinder 11, is attached to the rod 27 which is provided with a cross-arm 28 at its top and guide webs 29 intermediate the cross-arm 28 and the piston 26. The piston 26 is adapted to rest upon the top surface of the concrete in the cylinder 11, and the rate of movement of the concrete out of the cylinder 11, when the gate 14 is opened and vibration is provided, is ascertained by timing the fall of the cross arm 28 from its upper position to some lower position. The cross-arm 28 prevents the further fall of the piston when the concrete is completely discharged from the cylinder, provided the length of the rod 27 is suitably adjusted. The cylinder 11, with its gate valve 14 and the frame member 15 and legs 16 may be easily disengaged from the receiving container 12, and the receiver 12 with attached vibrator 13 may be lifted from the braces 19, to permit discharge of the batch of concrete used in the performance of the test.

In the form shown in Fig. 4, the upper cylinder and its gate valve, piston and rod, and supporting frame are represented as similar to those of Fig. 1. The receiving container 12, however, is attached to the base plate 18 by the braces 19, which are rigidly fastened to the upper edge of the container, and to extensions of the bottom plate 30 of the container. The vibrator 13 is attached by clamping means 31 to a fin 32 welded to the container 12. The vibrator 13 as here shown consists of a motor means 21, an elongated shaft 22a and an eccentric weight 23a, the shaft revolving in bearings 33 supported in an elongated casing 34.

In the form shown in Fig. 5, vibration of the upper cylinder 11 and its appurtenances is attained by supporting the cylinder on a frame 40 having legs 41 preferably rigidly attached at their lower ends to a base plate 18, and by attaching the vibrator means directly to the frame 40 supporting the cylinder 11. In this arrangement, no receiving container need be attached, it being only necessary that the discharge from the upper cylinder may fall freely under the force of gravity when the apparatus is vibrated and the slide valve 14 is open. This simpler form of apparatus does not permit any measurements of the compacting properties of the concrete upon vibration as does the arrangements shown in Figs. 1 to 4.

The procedure followed in operating the apparatus for measuring placeability of harsh concrete mixtures is, in general, to close the gate valve 14, remove the piston 26 and rod 27, and substantially fill the upper cylinder 11 with the concrete mixture. The piston 26 is then placed on the top surface of the concrete, the gate valve 14 is opened, and simultaneously the vibrator unit 13 is set in operation. The time required to empty the cylinder, or the time required for the piston 26 to move a selected distance as measured by the movement of the rod 27 or the cross-arm 28, is ascertained, and a comparison made with the times required for other mixtures to be discharged in the same apparatus operating under closely similar conditions. In the forms of apparatus in which the receiving container 12 is vibrated, additional measurements and observations may be made upon the formed concrete mass in the receiver 12, after compaction by the vibration of the whole apparatus during the vibration to determine rate of flow from the upper cylinder. When used in this manner, the vibration is discontinued, and the timing ended, when the piston 26 rests upon the surface of the compacted block of concrete just below the discharge mouth of the cylinder 11 and in the container 12. The formed block of concrete in the receiving container may be removed by disassembly of the apparatus and inverting the receiving container 12, the inverted cone-shape of the latter permitting easy removal, with or without subsequent vibration of the inverted receiving container 12 by its attached vibrator means 13.

By means of this apparatus for measuring the placeability or workability of non-plastic, harsh concrete mixtures, valuable information may be readily obtained by which better control of the composition of these concrete mixtures may be attained.

While I have disclosed several forms of apparatus in which the measurement of certain physical properties of unset concrete of low plasticity may be carried out, I wish it to be understood that I do not desire to be limited to the exact details of construction shown and described, for obvious modifications will occur to a person skilled in the art.

I claim:

1. An apparatus for measuring properties of unset concrete comprising an elongated discharge hopper of substantially uniform cross-section, gate means for closing and opening said hopper near its lower end, means for supporting said hopper so that concrete therein may be discharged freely through said gate means, and means for vibrating said hopper.

2. An apparatus for measuring properties of unset concrete comprising an elongated discharge hopper of substantially uniform cross-section, gate means for closing and opening said hopper near its lower end, means for supporting said hopper so that it may discharge concrete freely through said gate means, a vibrator adapted to vibrate said hopper, and means for continuously indicating the position of the top level of the concrete in the hopper.

3. An apparatus for measuring properties of unset concrete comprising an elongated discharge hopper of substantially uniform cross-section, gate means for closing and opening said hopper near its lower end, means for supporting said hopper so that it may discharge concrete freely through said gate means, means for vibrating said hopper, and a handled loose-fitting plunger in said hopper adapted to indicate the position of the top level of the concrete in the hopper.

4. An apparatus for measuring properties of unset concrete comprising an elongated discharging hopper having a substantially uniform cross-section, gate-means for opening and closing said hopper near its lower end, a receiving container below said hopper and attached thereto, and means for vibrating said receiving container.

5. An apparatus for measuring properties of unset concrete comprising an elongated discharging hopper having a substantially uniform cross-section, gate means for opening and closing said hopper near its lower end, a receiving container substantially centered below said hopper and attached thereto, means for vibrating said receiving container, and means for continuously indicating the position of the top level of the concrete in the hopper when the concrete is being discharged through said gate means.

6. An apparatus for measuring properties of unset concrete comprising an elongated discharging hopper, gate means for opening and closing said hopper near its lower end, a receiving container substantially centered below said hopper and attached thereto, means for vibrating said receiver container, and a handled plunger for continuously indicating the position of the top level of the concrete in the hopper.

7. An apparatus for measuring properties of unset concrete comprising a base plate, a receiving container rigidly attached to said base plate, an elongated discharge hopper having gate means near its lower end for closing and opening said hopper, supporting means for said hopper removably attached to said receiving container so that concrete may be freely discharged through said gate means from the hopper to the container, means for vibrating said hopper and said container, and means for continuously indicating the position of the top level of the concrete in the hopper when concrete is being discharged through said gate means.

8. An apparatus for measuring properties of unset concrete comprising an elongated discharging hopper, gate means for opening and closing said hopper near its lower end, a receiving container substantially centered below said hopper and attached thereto, means for vibrating said receiving container, a loose fitting plunger in said hopper adapted to rest on the top of the concrete in the hopper and after the concrete is discharged to rest on the top surface of the concrete in the receiving container, and an elongated rod on said plunger protruding from the top of the hopper, and adapted to indicate the position of the top surface of the concrete at all times during the test.

G. W. HUTCHINSON.